ELECTRONIC DIGITAL BINARY COMPUTER

Filed Feb. 15, 1949 3 Sheets-Sheet 1

ACCUMULATOR FOR STAGES A, C AND E

ACCUMULATOR FOR STAGES B, D AND F

INVENTORS
JAN A. RAJCHMAN
& GEORGE W. BROWN
BY Morris ... [signature]
ATTORNEY

ELECTRONIC DIGITAL BINARY COMPUTER

Filed Feb. 15, 1949

INVENTORS
JAN A. RAJCHMAN
& GEORGE W. BROWN
BY Morris G. Rabkin
ATTORNEY

ELECTRONIC DIGITAL BINARY COMPUTER

Filed Feb. 15, 1949 3 Sheets-Sheet 3

INVENTORS
JAN A. RAJCHMAN
& GEORGE W. BROWN
BY Morris L. Kahan
ATTORNEY 2,968,439

ELECTRONIC DIGITAL BINARY COMPUTER

Jan A. Rajchman, Princeton, N.J., and George W. Brown, Pacific Palisades, Calif., assignors to Radio Corporation of America, a corporation of Delaware Filed Feb. 15, 1949, Ser. No. 76,624

23 Claims. (Cl. 235—175)

This invention relates to electronic digital binary computing systems, and in particular to a binary computer capable of performing the processes of multiplication and division, as well as addition and subtraction.

The present invention utilizes apparatus and employs principles previously described and claimed in our application for U.S. Letters Patent, Serial No. 757,262, filed June 26, 1947, for "Electronic Adder," now Patent No. 2,503,765, issued April 11, 1950, and application Serial No. 776,439, filed September 27, 1947, for "Electronic Cumulative Adder," now Patent No. 2,568,932, issued September 25, 1951. These copending applications describe the theory of binary computation and apparatus designed to obtain the sum or difference of two numbers expressed in the binary system of computation. The latter application provides, in addition, an accumulator in which the accumulated sum of a number of successive additions or subtractions may be held.

It is well known, that the process of multiplication may be accomplished by performing a series of additions and that the process of division may be accomplished by a series of subtractions. To aid in the understanding of the present invention, an illustration of each of these processes utilizing binary computation is given hereinafter. It is also well known that the process of subtraction may be accomplished by properly adding one number to the complement of the other number, dropping the number in the highest place, and adding one. In binary computation this process is greatly simplified over the equivalent process in the decimal system since only two numbers are used, zero and one, and the complement of zero is one while the complement of one is zero. This simply involves a simple reversal, and avoids the necessity of making a subtraction as is required in decimal complementation.

Consequently, multiplication is reduced to a sequence of simple additions, each step including appropriate shifting of one of the numbers with respect to the other. Division also may be reduced to a sequence of simple additions of the complement of one number, accompanied by appropriate relative shifting.

Accordingly, it is the principal object of this invention to provide an improved electronic digital computer, operating under the binary system of computation, capable of performing accurately and quickly the mathematic process of addition, subtraction, multiplication and division.

It is a further object of this invention to provide electronic computing apparatus of the type including an electronic memory which includes a memory element for each of as many digital places as may be desired, together with means for setting the conditions of the memory elements to one or the other of two conditions of stability representative, respectively, of the two binary digits, zero and one, means for adding to the number held in the accumulator another number, or its complement, and means for shifting one of the numbers with respect to the other to provide proper registry of the binary places for each stage of the process.

It will be shown later that in performing the process of division the complemented divisor is added to the dividend to determine whether or not the difference is positive or negative. If the difference is negative the addition is not actually made, and this fact is recorded by placing a zero in the highest place of the quotient. The dividend is then shifted and the trial repeated, a positive resultant indicating that the addition should be made, and a one placed in the appropriate place of the quotient. It is therefore a further object of this invention to provide means for determining whether or not the addition of the complemented divisor to the dividend would be positive by developing a voltage indicative of the sign of the trial difference, and to utilize this voltage to control the process so that the accumulator is set to indicate the difference only when it is positive, and also to record automatically in a suitable memory element the proper digit of the quotient.

It will be understood that the "places" in the binary system correspond to ascending powers of two, while the "places" in the decimal system correspond to ascending powers of ten. Consequently many more "places" are required in binary computation to express a given number than is required in decimal notation. Thus, it is a very important problem to keep the number of electronic devices required for each stage or "place" to an absolute minimum. Furthermore, duplication of stages must be avoided. In the present invention, as in our copending applications referred to above, each stage utilizes only three electron discharge devices which require electrical power to operate, plus one small neon lamp indicator which is used only if visual indication is desired. Thus, shifting is accomplished in a novel manner which does not require the provision of any additional power-consuming discharge devices. It is, therefore, a still further object of the present invention to provide a simple, inexpensive electronic computer which is characterized by a minimum number of electron discharge devices, the economy being effected both by minimizing the components of each stage of the computer and by so utilizing the stages interchangeably that the utmost economy is realized.

The novel features that are considered characteristic of this invention are set forth with particularity in the appended claims. The invention itself, however, both as to its organization and method of operation, are best understood from the following description when read in connection with the accompanying drawings, in which Fig. 1 is a circuit diagram of an electronic accumulator or memory element;

Figure 1:
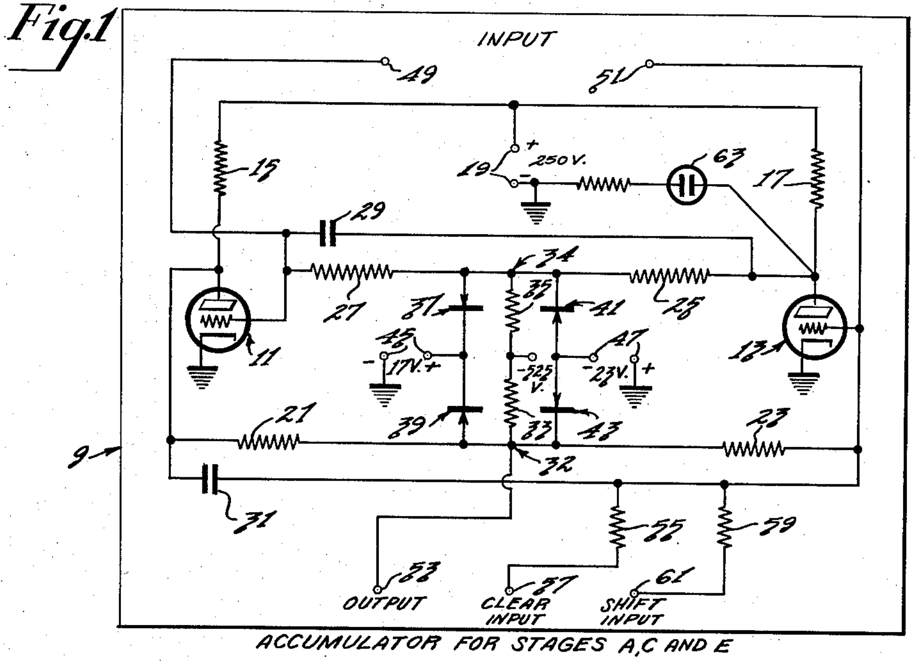
Fig. 1A is a circuit diagram of a similar accumulator which differs only in the connections to the terminals provided to connect the device in the computer of this invention.

Inasmuch as it is the purpose of this invention to provide an electronic computer which functions in accordance with the binary system of computation, it will be helpful to review briefly the mathematical processes employed in multiplying and dividing binary numbers. It will be understood that, in general, the mathematical processes in the decimal and binary systems are identical. However, the process is greatly simplified in the binary system since only two numbers are employed, namely, 0 and 1. As is well known, the process of multiplication can be resolved into a series of additions, while the process of division can be resolved into a series of subtractions. A further simplification arises from the fact that by employing the complement of the subtrahend or divisor, subtraction and thus division may also be accomplished by a series of additions. In the case of multiplication and division, however, the numbers to be added must be relatively shifted one binary place after each step in a manner similar to that conventionally employed in the manual process of multiplication under the decimal system.

The above general statements will be illustrated by simple examples. Assume we wish to multiply, for example, 11 by 13. The multiplicand 11 expressed in the binary system is 1011, while the multiplier 13, expressed in the binary system is 1101. The successive steps of multiplication may then be illustrated as follows:

```
    1011   Multiplicand          (11)
    1101   Multiplier            (13)
    ----
    1011   First subproduct
   0000    Second subproduct, shifted
   -----
   01011   First subtotal
  1011     Third subproduct, shifted
  ------
  110111   Second subtotal
 1011      Fourth subproduct, shifted
--------
10001111   Last subtotal or product
           (=143=13×11)
```

It will be observed that, in accordance with the conventional practice in decimal multiplication, the first step is to multiply the multiplicand by the number in the lowest binary place of the multiplier, which in the present illustration is a one, and to write the first subproduct 1011 which is simply the multiplicand itself. The second step is to multiply the multiplicand by the number in the next higher binary place of the multiplier to produce the second subproduct which is zero, and to add the first and second subproducts after shifting the second subproduct one place to the left with respect to the first subproduct. In conventional practice, the addition of all the shifted subproducts is usually accomplished in one final step. However, separate additions may be made, as in this illustration. The two numbers added produce the first subtotal 01011. The multiplicand is then multiplied by the number in the third binary place of the multiplier, which is a one, shifting this third subproduct one additional place to the left and adding it to the first subtotal to produce the second subtotal 110111. Finally, the multiplicand is multiplied by the number in the fourth binary place of the multiplier, which is again a one, shifting this fourth subproduct one further place to the left and adding it to the second subtotal to produce the last subtotal or product, 10001111. Under the binary system this number equals 143 which is the product of 11×13 as required.

It will be observed, therefore, that the process of multiplication in the binary system consists simply in adding or not adding to the accumulated subtotals the properly shifted multiplicand, depending on whether or not the successively higher digits of the multiplier are one or zero respectively. Thus, multiplication consists simply of a series of cumulative additions in which the numbers to be successively added are shifted one binary place, one with respect to the other. It is, of course, immaterial whether the subproduct is shifted to the left or the subtotal to which it is added is shifted to the right, so long as the proper powers of 2 are added together. Furthermore, it is immaterial whether the higher or lower digits of the multiplier are taken first, so long as the proper relative positions are maintained.

To divide one number, the dividend, by another, the divisor, to obtain a quotient, the procedure in the binary system is essentially the same as a subtractive procedure which is well known in the decimal system, although in this case the procedure is much simplified. Assume that we now wish to divide 143 by 11. In this case, the divisor 1011 is written under the dividend 10001111 so that the highest powers of two of two numbers are in register, as follows:

```
  10001111   Dividend
 -1011       Divisor
 ----------
-1/11011111
```

It will be observed that if we now attempt to subtract the divisor from the dividend, the resultant will be negative, as indicated by the −1 in the place to the left of the highest binary place of the divisor. The −1 is a sign indicator which indicates that the divisor does not "go" into the dividend and that the digit in the highest binary place of the quotient is zero. Since the divisor did not "go" into the dividend, the subtraction is not made, and the dividend is next shifted one place to the left with respect to the divisor as follows:

```
  10001111   Dividend shifted
 -1011       Divisor
 ----------
 0/0110111   First subdifference
```

The fact that the first subdifference is a positive number is indicated by the zero in the place to the left of the highest binary place of the divisor, as before. This indicates that the digit in the second highest binary place of the quotient is a one, and the subtraction is made to produce the first subdifference. We now repeat the process, using the first subdifference instead of the dividend and attempting to subtract the divisor, after moving the first subdifference one place to the left with respect to the divisor.

```
  00110111   First subdifference, shifted
   -1011     Divisor
 ---------
 00/001011   Second subdifference
```

We see that the result of this subtraction if made, would be positive, the sign indicator again being in the same position. Therefore, we note that the digit in the third highest place of the quotient is a one. The subtraction is made and the process repeated, using the second subdifference shifted one further place to the left, as follows:

```
  00001011   Second subdifference, shifted
    -1011    Divisor
  --------
  -1/10101
```

In this case the remainder is negative and the subtraction therefore is not made. As before, the sign indicator, −1, appears in the place to the left of the divisor. We note that the digit in the fourth highest binary place of the quotient is a zero. The second subdifference is then moved a further place to the left, as follows:

```
  00001011   Second subdifference, shifted
     -1011   Divisor
   -------
    0/0000   Remainder =0
```

From this we see that the subtraction can be made, and we determine that the digit in the fifth highest binary place of the quotient is a 1. Completing the subtraction, the remainder is determined. Thus, we have determined that the quotient equals 01101=13, and the remainder zero as required.

The above illustrates that division may be accomplished by a successive series of subtractions where the divisor is successively subtracted from the descending powers of the dividend, or not, depending upon whether the difference is positive or negative. If the difference is positive, the digit of the quotient is a one. If the difference is negative, the quotient digit is a zero. Also, if the difference is negative, the subtraction is not made but the dividend is shifted one place with respect to the divisor and the quotient determined for each trial until a positive difference is obtained. For each trial the appropriate quotient digit is determined, the divisor subtracted from the dividend, if the difference is positive, and this operation repeated, using the difference instead of the dividend, until the remainder equals zero, or an indivisible fraction. The quotient is obtained by noting whether or not the attempted subtractions are positive or negative, the successive digits of the quotient being zero when the subtraction would have been negative and one when the difference is positive, these numbers being written in the places representing the descending powers of two to form the quotient.

It has also been previously demonstrated and has been described in some detail in the copending application of Rajchman and Brown application Serial No. 776,439, filed September 27, 1947, now Patent No. 2,568,932 issued September 25, 1951, that the process of subtracting a number "Y" from a number "X" can be accomplished by adding to "X" the complement of the number "Y," dropping the number in the highest place and adding one. In the binary system the complement of any number is obtained by changing all the ones to zero and all the zeros to one. In this case, the number appearing at the left of the sum, that is, in the highest binary place, is to be dropped, and does not form a part of the resultant. However, in this case, if the number in the highest binary place is a zero, it indicates that the difference is negative while if the number in the highest binary place is a one, it indicates that the difference is positive. Thus, the number to the left becomes a sign indicator. The reversal of the indicator is due to the use of the complement of the divisor.

Under this system, the process of division now becomes a succession of additions where the number to be added to the dividend is the complement of the divisor. Using the same example as above, to divide 143 by 11, we write

| | |
|---|---|
| 10001111 | Dividend |
| +0100 | Divisor complemented |
| + 1 | Add 1 |
| 0/1101 | |

Since the sign indicator, that is, the number in the binary place to the left of the divisor is zero, the result is negative and therefore the subtraction is not made, as the divisor does not "go" into the dividend. As before, therefore, the number in the highest binary place of the quotient is a zero. Proceeding as before, we now shift the dividend to the left with respect to the divisor complemented (which is equivalent to shifting the divisor one place to the right), as follows:

| | |
|---|---|
| 10001111 | Dividend shifted |
| + 0100 | Divisor complemented and shifted |
| + 1 | |
| 1/0110 | First subtotal |

Since the sign indicator is now one, we note that the divisor "goes" into the dividend, the addition is made and the number in the second highest binary place of the quotient is a one.

Using the first subtotal, but dropping the number in the highest place, we now again add the complemented divisor to the shifted subtotal as before:

| | |
|---|---|
| 0110111 | First subtotal, shifted |
| + 0100 | Divisor complemented |
| + 1 | |
| 1/0010 | Second subtotal |

Since the sign indicator is one, we determine that the number in the third highest binary place of the quotient is a one. The addition is made as before to obtain the second subtotal. Using the second subtotal shifted, but dropping the indicator, the process is repeated as follows:

| | |
|---|---|
| 001011 | Second subtotal shifted |
| + 0100 | Divisor complemented |
| + 1 | |
| 0/1010 | |

The sign indicator being zero, the addition is not made. The number in the fourth highest binary place of the quotient is a zero.

Finally, the second subtotal is again shifted, and the complemented divisor added as follows:

| | |
|---|---|
| 1011 | Second subtotal shifted again |
| +0100 | Divisor complemented |
| + 1 | |
| 1/0000 | Third subtotal or remainder |

Again the sign indicator is positive and we determine that the number in the lowest binary place of the quotient is a one. Thus the quotient has been determined as being equal to 01101=13, as required.

It should be noted here that if the divisor is considered as a reference with respect to which the dividend is successively shifted the "one" which is added in each case is always in the same position with respect thereto. Also the indicator always appears in a fixed position with respect to the divisor. This fact will be utilized in the computer of this invention as will appear more fully hereafter.

Apparatus for accomplishing electronically the processes of numerical multiplication and division, and if desired, addition and subtraction, in the binary system will now be described.

Reference is first made to Fig. 1 which illustrates an electronic accumulator or memory element 9 which is one component of the computer, and which should first be understood because this basic element is utilized in each stage of the computer.

The memory 9 comprises two tubes 11 and 13 having their cathodes grounded and their plates connected through resistors 15 and 17, respectively, to a suitable source of positive potential at terminals 19. The plate of the first tube 11 is connected serially to the grid of the second tube 13 through two resistors 21 and 23. Similarly, the plate of the second tube 13 is connected to the grid of the first tube 11 through two series resistors 25 and 27. Capacitors 29 and 31 may be connected across these resistor pairs.

The mid-point 32 between resistors 21 and 23 is connected through resistor 33 to a source of high negative potential, say, −525 volts. Likewise, the midpoint 34 between resistors 25 and 27 is connected to the same source of negative potential through resistor 35. A first pair of rectifiers 37, 39 is connected in series "back to back" across resistors 33 and 35 with their anode electrodes out, while a second pair of rectifiers 41, 43 is also connected in series across resistors 33, 35, "back to back" with their anodes in. The cathodes of rectifiers 37, 39 are connected to a source of fixed positive potential of, say +17 volts, as by terminals 45. The anodes of rectifiers 41 and 43 are connected to a fixed source of negative potential, say −23 volts, as by terminals 47.

Input terminals 49, 51 are connected to the grid electrodes of tubes 11 and 13 respectively. Regulated output of either +17 or −23 volts with respect to ground may be obtained from output terminal 53 connected to point 32. Regulated output of opposite polarity, that is, either −23 or +17 volts with respect to ground, can be obtained from point 34 if desired. The actual polarity at either point depends upon the condition of conductivity of tubes 11 and 13 and the two voltages will always be opposite, one with respect to the other. The grid of tube 13 is also connected through resistor 55 to a "clear" input terminal 57 and through resistor 59 to a "shift" input terminal 61.

The accumulator 9 is basically a well-known flip-flop having two conditions of stability. That is, either tube 11 is conducting and tube 13 cut off, or vice versa. Whatever condition exists at any time will continue indefinitely. However, the existing condition can be reversed by driving the grid of the conducting tube to a negative potential, or the grid of the non-conducting tube to a positive potential. Standardization of the output voltages to either one of two chosen values is accomplished by the rectifiers 37, 39, 41 and 43. The circuit constants are so selected that when tube 11 is non-conducting, for example, the anode of rectifier 39 tries to go to a value above +17 volts. At this point, however, the rectifier becomes conductive and its anode potential is held substantially to +17 volts which is its cathode potential. At the same time, the relatively low plate voltage of the conducting tube 13, taken with the effect of the —525 volt source applied through resistor 35, causes the cathode of rectifier 41 to tend to assume a very low negative potential. But again the actual potential is limited and held to substantially —23 volts by the action of rectifier 41. In the opposite condition of conductivity of tubes 11 and 13, rectifiers 37 and 43 behave similarly. Thus the output potentials are always limited to substantially fixed values determined by the fixed potential from a low impedance source provided at terminals 45 and 47.

If desired, a visual indicator may be provided for indicating the condition of the switch. Thus a neon lamp 63 may be connected between the plate of tube 13 and ground through a limiting resistor. When tube 13 is not conducting, the lamp will light. When tube 13 is conducting the tube will be extinguished.

As will appear later, the computer of the present invention will utilize a number of accumulators 9 of the type illustrated in Fig. 1. It will also use a number of accumulators substantially identical thereto, as illustrated in Fig. 1A, to which reference is now made.

Figure 1A:
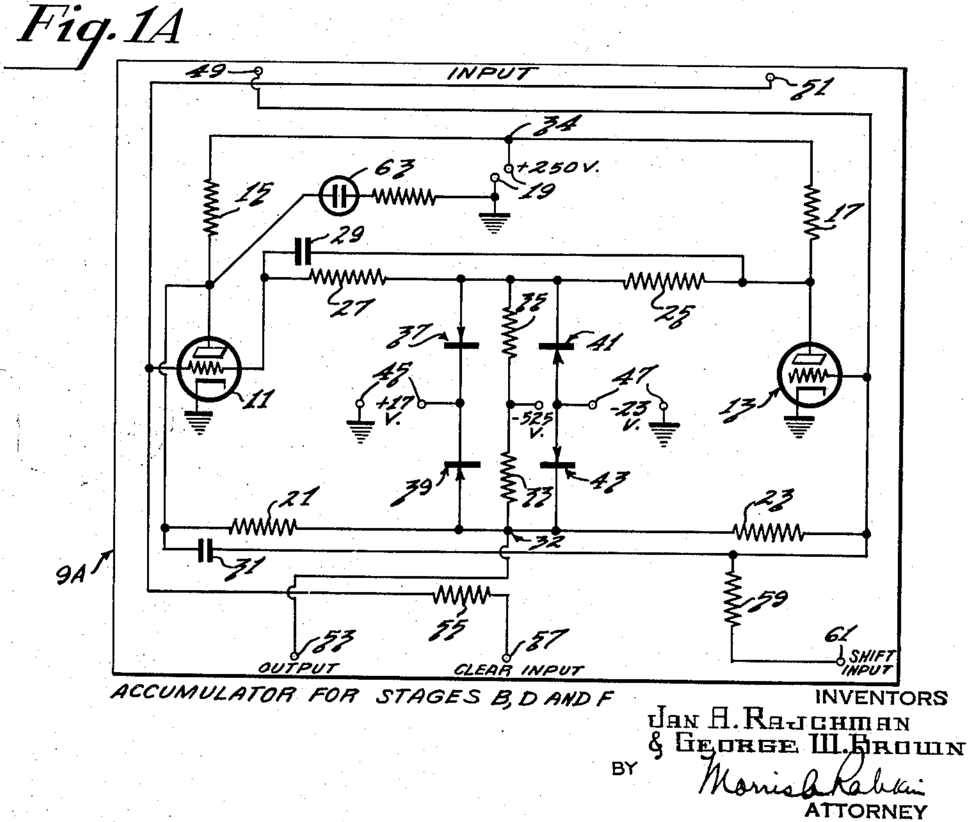

Accumulator 9A of Fig. 1A differs from accumulator 9 only in the fact that terminal 49 is connected to the grid of tube 13, instead of to the grid of tube 11; terminal 51 is connected to the grid of tube 11, instead of to tube 13; and the "clear" input terminal 57 is connected to the grid of tube 11, instead of to the grid of tube 13. Neon tube 63 is connected to the plate of tube 11, instead of to the plate of tube 13. Similar parts bear similar reference numerals, and the operation is identical. It is therefore not necessary to describe further this form of switch.

Figures 2A, 3:
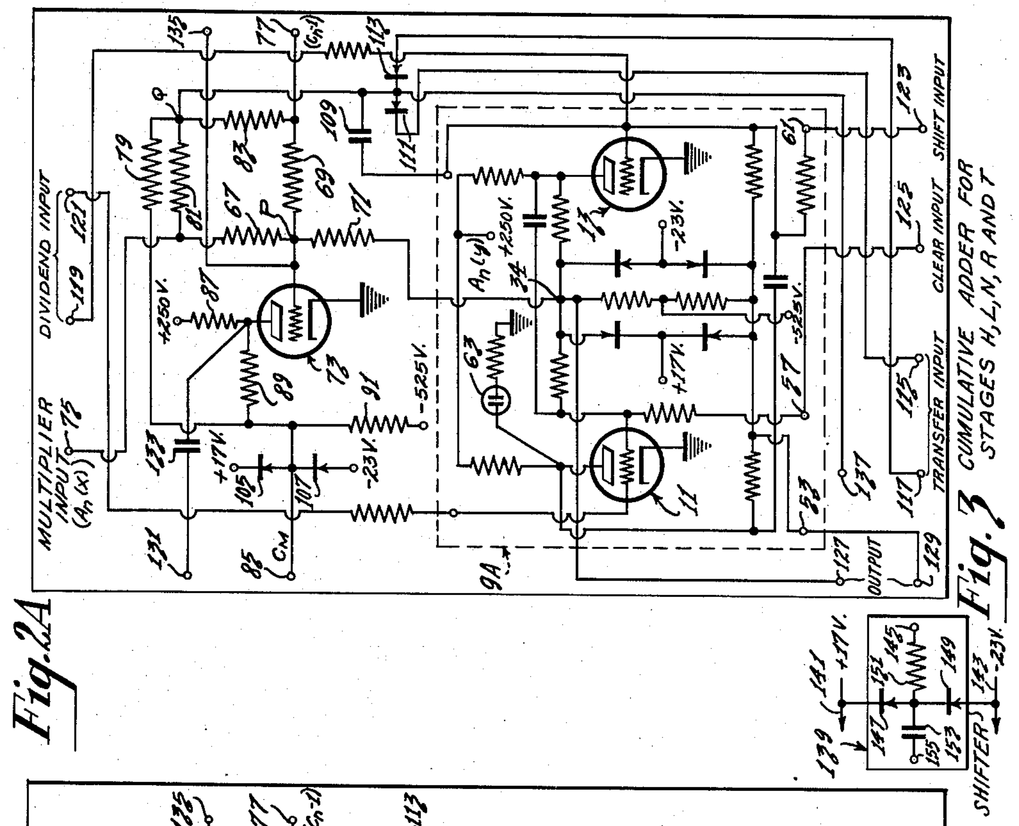
Fig. 2A is a circuit diagram of a similar stage which differs only in the connections to the terminals provided to connect the device in the computer.
Fig. 3 is a circuit diagram of a shifting device which is utilized in the invention.
Figure 2:
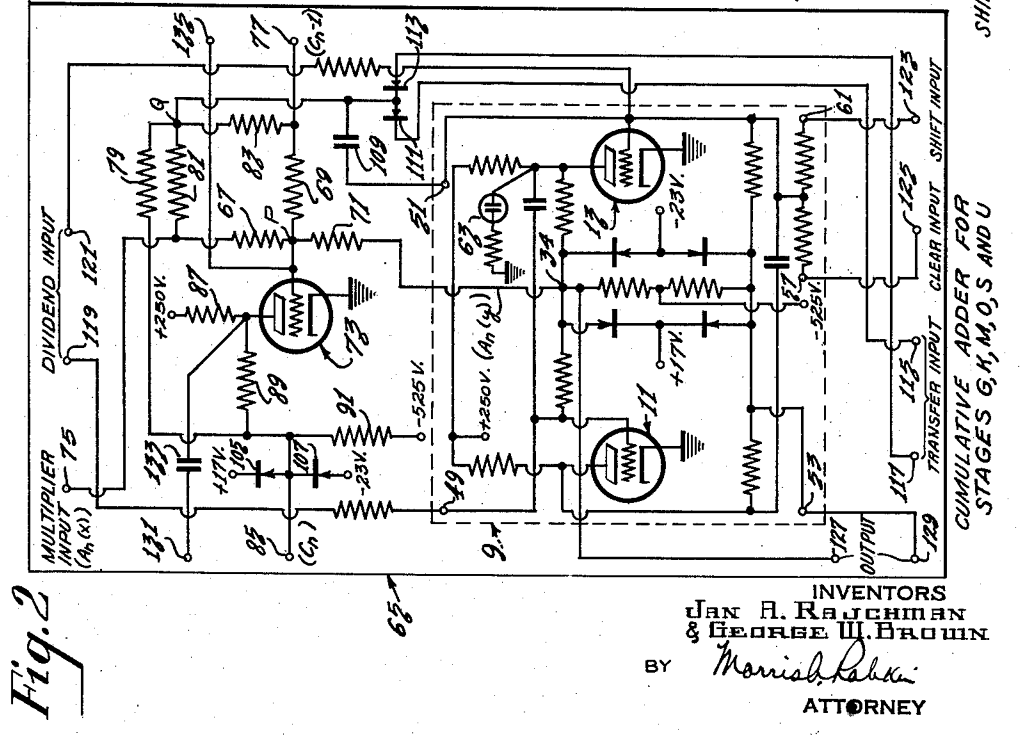
Fig. 2 is a circuit diagram of a cumulative adder stage which is used in the present invention.

The complete computer of the present invention also includes a number of cumulative adder stages of the basic type described and claimed in the copending application of Jan A. Rajchman et al., Serial No. 776,439, filed September 27, 1947, for an "Electronic Cumulative Adder," now Patent No. 2,568,932. One such stage 65 is illustrated in Fig. 2. It may also be noted that the cumulative adder stages embodies within it one switch 9, as described above. The connections and process of addition within each stage are as described and claimed in the above copending application, and will therefore be described here only briefly.

Referring to Fig. 2, two resistance networks of three resistors each are employed. One end of each resistor 67, 69, 71 of the first of these networks is connected to a common point "P," which is also connected to the grid of a triode 73. The outer end of resistor 67 is connected to multiplier input terminal 75 to which the voltage representing the digit $A_n(x)$ is applied; resistor 69 is connected to carry-over input terminal 77 to which the voltage representing the carry-over $C_{n-1}$ from the preceding stage is applied; and resistor 71 is connected to point 34 of accumulator 9 which represents the digit $A_n(y)$ to which $A_n(x)$ is to be added. In the second resistance network, one end of each resistor 79, 81 and 83 is connected to a common point "Q." The other end of resistor 79 is connected to the standardized plate output of tube 73 which is the carry-over $C_n$ for the following stage; resistor 81 is connected to multiplier input terminal 75; while resistor 83 is connected to carry-over input terminal 77. The standardized output of tube 73 is also applied to carry-over output terminal 85. The plate circuit for tube 73 is energized by a suitable source of positive potential through a plate loading resistor 87. The standardized output is taken from the plate circuit at the midpoint of two series-connected resistors 89 and 91, the remote end of the latter terminating at a source of fixed negative voltage of the order of —525 volts. The values of resistors 87, 89 and 91 are so selected that when the tube is non-conducting, the voltage at the intermediate point between resistors 89 and 91 tends to exceed +17 volts, while when the tube is conducting, the voltage at this point tends to be lower than —23 volts. A pair of biased rectifiers 105 and 107 are connected across the tube output lead and tend to maintain the output voltage at standardized values of +17 and —23 volts as has been explained previously.

In our copending application Serial No. 757,262, it has been demonstrated that any binary number "X" may be represented by the series $$x = A_0(x)2^0 + A_1(x)2^1 + A_2(x)2^2 + \ldots A_n(x)2^n + \ldots$$

It has also been shown that the value of the digit $A_n$ in the $n$th place of the sum of two numbers $x$ and $y$ is:

$$A_n(x+y) = A_n(x) + A_n(y) + C_{n-1} - 2C_n$$

It is to be understood that the voltage $A_n(x)$ applied to multiplier input terminal 75 is either +17 or —23 volts. It is assumed that in the computer stage of the type illustrated in Fig. 2, that the binary number one will be represented by +17 volts and the binary number zero will be represented by —23 volts. It will also be understood that a voltage $C_{n-1}$ of one or the other of the same two values will be applied to carry-over input terminal 77, and, similarly, the voltage $A_n(y)$ at point 34, which is determined by the condition of the accumulator 9, will also have one or the other of the same two values.

As to the values of the various resistors of the two resistor networks, it will be recalled that five of these have identical values of approximately 62,000 ohms, while resistor 79 is one-half of this value. These resistors constitute averaging networks. Table I below shows the resulting voltage at terminal 85 ($C_n$) and point Q for all possible combinations of input voltages $A_n(x)$, $A_n(y)$ and $C_{n-1}$.

TABLE I

| | (1) $A_n(x)$ | (2) $A_n(y)$ | (3) $C_{n-1}$ | (4) $C_n$ | (5) $C_n$ | (6) Point Q |
|---|---|---|---|---|---|---|
| (a) | −23 | −23 | −23 | +17 | +17 | −3 |
| (b) | +17 | −23 | +17 | −23 | −23 | −3 |
| (c) | +17 | −23 | −23 | +17 | +17 | +7 |
| (d) | −23 | −23 | +17 | +17 | +17 | +7 |
| (e) | −23 | +17 | −23 | +17 | +17 | −3 |
| (f) | +17 | +17 | +17 | −23 | −23 | −3 |
| (g) | +17 | +17 | −23 | −23 | −23 | −13 |
| (h) | −23 | +17 | +17 | −23 | −23 | −13 |

The carry-over $C_n$ applied to point Q through resistor 79 from the output of tube 73 is shown twice since resistor 79 is half the value of the other resistors.

Point Q is coupled by a capacitor 109 to accumulator input terminal 51 and thus to the grid of the second tube 13. Point Q is also connected to the anode of rectifier 111 and the cathode of rectifier 113. The cathode of rectifier 111 is connected to transfer input terminal 115 while the anode of rectifier 113 is connected to transfer input terminal 117.

"Dividend" input terminals 119 and 121 are connected, respectively, to the grid electrodes of tubes 11 and 13, through isolating resistors, if desired. A "shift" input terminal 123 is also connected to the "shift" input terminal 61 of switch 9, and thus to the grid of tube 13. "Clear" terminal 125 also connects to the same grid through terminal 57. Separate isolating resistors are preferably included in these connections. The separate connections to the same grid are provided for convenience as will appear more fully hereinafter. The isolating resistors allow the separate application of controlling voltages from different sources without mutual interference. Two output terminals 127 and 129 are provided. The former is connected to point 34 of switch 9 while the latter is connected to terminal 53 which is the accumulator output of opposite polarity. Accordingly, depending upon the condition of the accumulator 9, the potential of output terminal 127 will be −23 with respect to ground and the potential of output terminal 129 +17 volts, or vice versa.

Ii will subsequently appear that a number of computer stages of this type are connected in cascade. In order to speed up the transfer of information from one stage to the other, a small amount of capacity coupling from the plate of a triode 73 of one stage to the grid of the corresponding tube of the next stage may be employed. For this purpose coupling output terminal 131 is connected to the plate of tube 73 by interstage coupling capacitor 133 while coupling input terminal 135 provides means for connecting the coupling capacitor of the preceding stage to the grid of tube 73.

The complete computer will employ a number of stages in cascade, as noted above. Alternate ones will be identical with the stage just described. Intermediate stages will be identical functionally but for convenience and symmetry of wiring, several changes are necessary in the connections of the various terminals. The intermediate computer stages are as illustrated in Fig. 2A. Fig. 2 differs from Fig. 2A as follows:

(1) "Dividend" input terminals 119 and 121 are cross-connected to opposite tubes.

(2) "Clear" terminal 125 is connected to the grid of tube 11 instead of to the grid of tube 13.

(3) An additional output terminal 137, connected to point "Q," has been added.

Since the balance of the circuit is identical to that described in connection with Fig. 2, it need not be described again. The same reference numerals have been used to identify identical parts.

One additional component which is used in circuit with each stage of the computer is illustrated in Fig. 3. Shifter 139 consists of two rectifiers 147 and 149 connected in series, the outer terminals of which are to be connected to two shifter bus leads 141 and 143 which are maintained normally at potentials of +17 and −23 volts respectively. Input terminal 145 is connected to the junction of the two rectifiers through a resistor 151 and then through a coupling capacitor 153 to output terminal 155. The operation of this device will be described hereinafter in connection with the overall operation of the computer. Having thus described the construction of the essential components of the computer of this invention, the complete apparatus will now be described.

Figure 4:
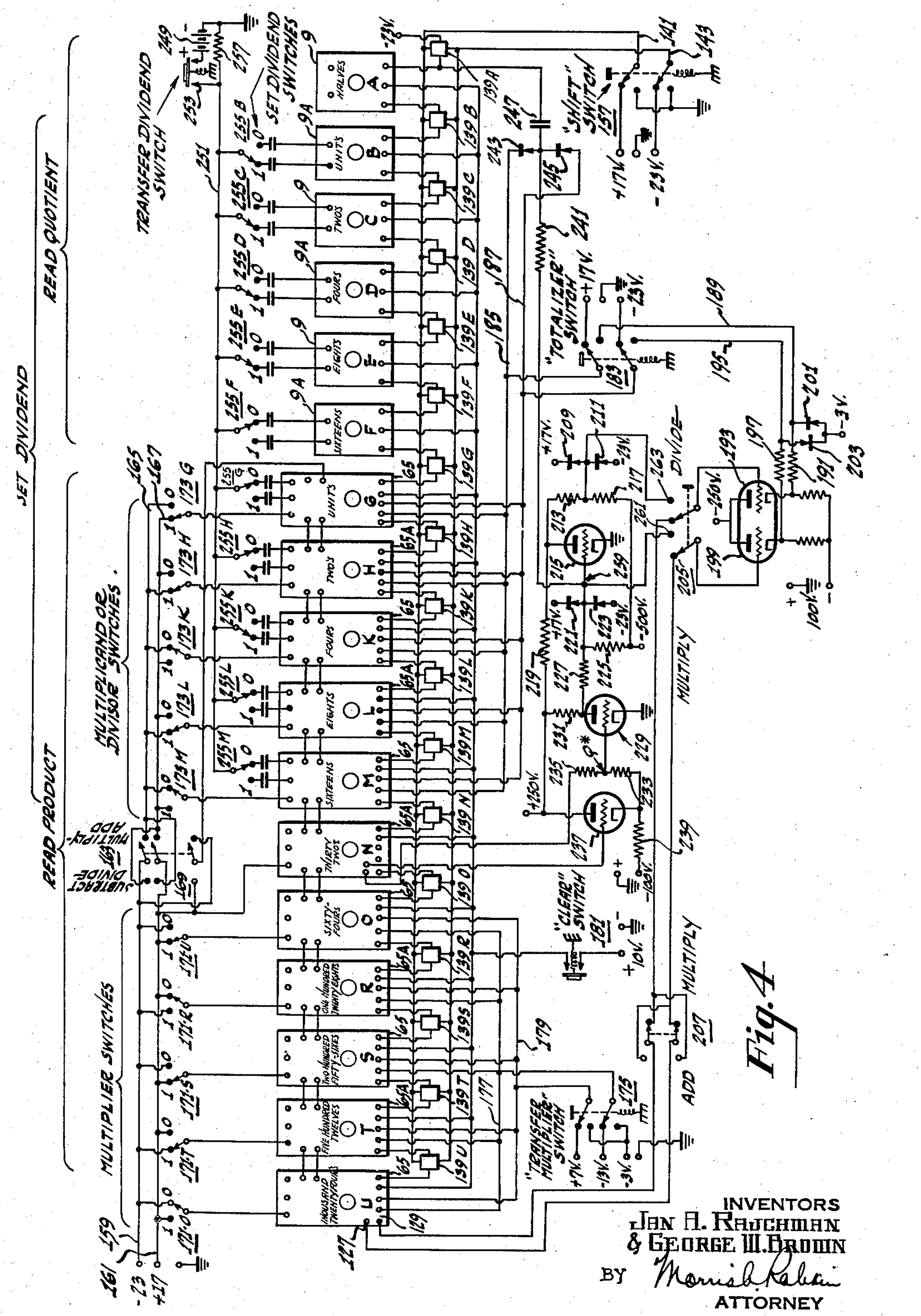
Fig. 4 is a circuit diagram, partly in block diagrammatic form, of a complete computer illustrative of the present invention.

An electronic computer for multiplying any five-digit binary number (the multiplier) by any other five-digit binary number (the multiplicand) or for dividing any ten-digit binary number (the dividend) by any five-digit binary number (the divisor) is illustrated in Fig. 4 to which reference is now made. It should be understood that one or more of the digits in the highest place may be zero so that small numbers may be multiplied or divided if desired. Similarly, since the connections between stages are entirely symmetrical, it will be obvious that as many additional stages as described may be added in accordance with the scheme of connection set forth so as to provide unlimited capacity for the device in solving problems of multiplication and division. Consequently, the illustration selected is purely by way of example and is not to be taken as a limitation of the ultimate capacity of an electronic computer constructed in accordance with the present invention.

It should also be mentioned that the stages of the computer illustrated in Fig. 4 are shown in ascending powers of two reading from right to left in accordance with the conventional method of writing decimal and binary numbers.

The computer itself includes six electronic switches 9 or 9A of the types illustrated in Figs. 1 and 1A which function as accumulators. Alternate accumulator stages 9, lettered A, C and E, are connected internally as shown in Fig. 1, while stages **9*a*, lettered B, D and F, are connected internally as shown in Fig. 1A. Eleven cumulative adder stages 65 or 65*a* are also employed. Alternate stages 65 are labeled G, K, M, O, S and U and are connected internally as shown in Fig. 2, while stages 65*a* are lettered H, L, N, R and T, and are connected internally as shown in Fig. 2A. The eleven adder stages are normally employed in two groups of five each, separated by stage N. It may here be noted that not all of the various input and output terminals are utilized in all of the various stages of the computer. However, it is desirable, for the sake of uniformity of manufacture, to provide identical stages, and therefore those terminals to which connections have not been made in any given case are not required in that stage. Of course, in practice, they may be eliminated completely if desired, but it is believed preferable to show all the terminals in each case so as to avoid confusion. In Fig. 4 the connection terminals of the various accumulator and adder stages 9 and 65 and of the shifters 139** have been shown in the relative positions shown in the detailed circuit diagrams of Figs. 1 and 2 and 3, respectively, and can thus readily be identified. To avoid confusing Fig. 4 of the drawing, however, the individual terminals have not been identified by separate reference numerals.

Shift input terminal 61 of each accumulator A through F is connected to output terminal 155 of an associated shifter 139, identified by the same letter, while the input terminal 145 of each shifter 139B through 139F is connected to the output terminal 53 of the next lower accumulator stage. Input terminal 145 of shifter 139A is connected to a fixed source of −23 volts. The output terminal 53 of accumulator stage F is similarly connected through shifter 139G to the shift input terminal 123 of the first adder stage G. The output terminal 129 of each adder stage G through T is likewise connected to the shift input terminal 123 of the next higher adder stage through an associated shifter 139. The remaining terminals of each shifter 139 are connected between a pair of shifter bus leads 141, 143, which leads are connected to a double-pole double-throw "shift" switch 157 so that in the normal position of the switch lead 141 is connected to a +17 volt source while lead 143 is connected to a −23 volt source. In the actuated position of the switch both leads are connected to ground.

A second pair of bus leads 159, 161 is connected to a −23 volt source and a +17 volt source as shown. This pair of leads terminates in a polarity reversing switch 163, the output of which is connected to a further pair of bus leads 165 and 167. Reversing switch 163, when operated, serves to reverse the polarity of the potentials applied to the leads 165 and 167. A single-pole, double-throw switch 169 is mechanically coupled to switch 163 for operation therewith and serves to connect carry-over input terminal 77 of the first adder stage G to one or the other of the leads 159 and 161 depending upon the position of the switch. Lead 161 is also connected to multiplier input terminals 75 of stage N, for a reason which will appear subsequently.

A single-pole, double throw multiplier switch 171 is provided for each of the five adder stages which comprise the "multiplier group" O, R, S, T and U, for connecting, at will, multiplier input terminal 75 of each of these stages to one or the other of the two leads 159 and 161. These switches are to be used in setting the digits of the multiplier to zero or one, and are identified by a letter which corresponds to the letter of the associated adder stage.

It should here be noted that the potential which will be used to represent a zero or a one may be chosen arbitrarily in each stage. However, for the sake of simplicity, it is preferred to adopt the convention that −23 volts will represent a zero in alternate stages while +17 volts will represent a zero in the other stages. The reason for this is explained more fully in the copending application referred to above and arises from the fact that tube 73 (see Fig. 2) produces a reversal of polarity between its grid and plate circuits, as is well known, and therefore the carry-over voltage produced in a given stage is reversed in polarity with respect to the selected convention of polarity employed in that stage. To avoid the necessity of utilizing an additional tube to re-invert the polarity of this carry-over voltage, it is preferred to reverse the convention of polarity representation in successive stages so that the carry-over may be utilized without reinversion.

By way of illustration, therefore, it is assumed that −23 volts will represent a zero in all the stages, including accumulators 9 and adders 65, while +17 volts will represent a zero in all the stages including accumulators 9A and adders 65A. In order that the operator may not become confused, it is preferable to have the left-hand position of each switch 171 represent "one" and the right hand position represent "zero." Consequently, the connections between the various switches 171 and the bus leads 159 and 161 are successively alternated as shown.

Five similar multiplicand switches 173G through 173M are utilized to apply to the input terminals 75 of stages G, H, K, L and M (which comprise the "multiplicand or divisor" group) appropriate voltages from the leads 165 and 167 in the same manner.

A "transfer multiplier" switch 175 connects a pair of conductors 177, 179 to −13 and +7 volt sources respectively, in its normal position. In the actuated position of the switch, both of these leads are connected to a −3 volt source, with respect to ground. Lead 177 is connected to transfer input terminal 117 of each of the five adder stages O, R, S, T and U; while lead 179 is connected to the other transfer input terminal 115 of each of these stages. The function of this switch is to transfer the multiplier into the accumulator, that is, to set these five adder stages in accordance with the binary number determined by the positions of their associated switches 171.

"Clear" switch 181 is provided for the purpose of setting all of the stages of the computer to their respective conditions indicative of zero. Each stage includes an accumulator and a visual lamp indicator 63. If it be assumed that zero is represented when the indicator lamp is out, the operation of the clearing switch will extinguish the lights in all of the stages so that the computer is cleared in readiness for a subsequent computation. This is accomplished by applying a voltage of approximately +10 volts to the "clear" input terminal 125 of each of the adder stages G through U (see Figs. 2 and 2A) and to the "clear" input terminal 57 of each of the accumulator stages A through F (see Figs. 1 and 1A).

Referring to Fig. 2, it will be appreciated that if a positive voltage is applied to clear input terminal 125, the grid of tube 13 will be driven positive so as to cause this tube to conduct, thus extinguishing indicator lamp 61. Thus stages G, K, M, O, S and U will be cleared. Similarly, applying +10 volts to the clear input terminal 125 of the adder stages of the type illustrated in Fig. 2A, it will be seen that tube 11 will be caused to conduct. In this case, however, indicator lamp 63 is connected to the plate circuit of tube 11 and therefore it will also be extinguished. Thus added stages H, L, N, R and T will be cleared. Similarly, the application of a positive voltage to clear input terminal 57 of the accumulator stage illustrated in Fig. 1, will cause tube 13 to conduct and indicator lamp 63 to be extinguished, thus clearing stages A, C and E. The application of the same voltage to the clear input terminal 57 of the accumulator illustrated in Fig. 1A will cause tube 11 to conduct, thus extinguishing indicator lamp 61 and clearing stages B, D and F.

The five added stages G, H, K, L and M, are also provided with switching means for transferring the multiplicand or the divisor, as determined by the settings of switches 173, into their associated adder stages. "Totalizer" switch 183 performs this function. This is a double-pole, double-throw switch, the movable arms of which are connected to a pair of leads 15 and 17. Lead 185 is connected to transfer input terminal 117 of each adder stage G, H, K, L and M, while lead 187 is connected to transfer input terminal 115 of these stages. In the normal position of the totalizer switch, the contacts are arranged so that lead 185 is connected to a +17 volt source while lead 187 is connected to a source of −23 volts with respect to ground. In the actuated position of the totalizer switch, lead 185 is connected through lead 189 and a current-limiting resistor 191 to the cathode of a cathode-follower tube 193; while lead 187 is connected through lead 195 and a similar current limiting resistor 197 to the cathode of a second cathode-follower tube 199. Lead 189 is connected to the cathode of a rectifier 201 and lead 195 is connected to the anode of a rectifier 203. The remaining electrodes of these rectifiers are connected to a −3 volt source. The cathodes of tubes 193 and 199 are connected to a relatively high negative potential source, such as −100 volts, through cathode resistors of appropriate value. The grid electrodes of these tubes are connected to the contact arms of a "multiply-divide" double-pole, double-throw switch 205. In the "multiply" position of this switch (which is also the position for adding) the grid of tube 193 is connected to the output terminal 129 of added stage U, while the grid electrode of tube 199 is connected to the output terminal 127 of the same stage.

A second polarity reversing switch 207 is inserted in these connections. The position shown effects the connections just described, and is the position for multiplication. In the other position the connections are reversed. The reversed connections are utilized for addition.

In the "divide" position of switch 205, the grid electrode of tube 193 is connected to the common point of a pair of voltage-limiting rectifiers 209 and 211. The cathode of rectifier 209 is connected to a source of +17 volts while the anode of rectifier 211 is connected to a source of −23 volts. The remaining electrodes of these rectifiers are connected together to form the common point referred to. This point is also connected through an averaging resistor 213 to the plate of a phase reversing tube 215, and also through a second averaging resistor 217 to a source of high negative voltage such as −500 volts. The plate of tube 215 is energized through a suitable plate-loading resistor 219 from a source of positive potential such as +250 volts. The cathode of this tube is grounded. In the "divide" position of switch 205 the grid electrode of tube 199 is connected to the grid electrode of phase reversing tube 215 and also to the common point of a further pair of rectifiers 221 and 223 which are connected to fixed voltage sources in the same manner as are the rectifiers 209 and 211 previously referred to.

The common point of rectifiers 221 and 223 is also connected through resistor 225 to the −500 volt source and through coupling resistor 227 to the plate of a coupling tube 229. The plate electrode of the tube is energized from the same +250 volt source through a plate load resistor 231, while its cathode is grounded. The grid electrode of this coupling tube 229 is connected to point Q* which is the mid-point of two averaging resistors 233 and 235. The other terminal of resistor 233 is connected to the cathode electrode of a cathode-follower tube 237 and through a cathode resistor 239 to a source of negative potential of −100 volts. The other terminal of resistor 235 is connected to output terminal 127 (see Fig. 2A) of adder stage N. The grid electrode of tube 237 is connected to output terminal 137 of the same stage.

Finally, the grid electrode of tube 215 is connected through an isolating resistor 241 to the mid-point of two additional rectifiers 243 and 245 which are connected in series between leads 185 and 187. The cathode of rectifier 243 is connected to lead 185 while the anode of rectifier 245 is connected to lead 187. The midpoint of these rectifiers is also coupled through a capacitor 247 to the shift input terminal 61 of accumulator A (see Fig. 1).

The group of ten consecutive stages B through M is used in performing the process of division. The stages are set in accordance with the dividend. This setting is accomplished by applying a pulse to one or the other of the tubes 11 or 13 so as to set the adder and accumulator stages and thus the indicator of each stage in accordance with the numerical value of the respective digit of the dividend. A source of voltage, such as battery 249, is connected between ground and a lead 251 by a push-to-operate "transfer dividend" switch 253. With the polarity as indicated, actuating switch 253 will raise lead 251 to a positive potential. This positive pulse may be applied through a coupling capacitor to the grid of tube 11 or 13 by means of "set dividend" switches 255, one of which is associated with each of the stages B through M. Thus, in its left-hand position representing "one," the switch 255B will apply to input terminal 49 (see Fig. 1A) a positive pulse which will cause tube 13 to conduct, thus causing indicator lamp 63 to light, as required. In stage C, the left-hand position of the associated switch 255C, indicative of the digit one, also applies a positive pulse to input terminal 49. However, since stage C is of the type illustrated in Fig. 1, this will cause tube 11 to conduct and the indicator tube 6B at that stage will light, as required. So also the other stages may be set in accordance with the positions of the various switches 255. In practice the switches 255 will normally be placed in the desired positions to represent the digits of the dividend, and then the dividend may be transferred to the accumulator stages in one operation by actuating the "transfer dividend" switch momentarily. Resistor 257 provides a slow discharge path for the capacitors.

The use of the computer in solving simple problems of addition, subtraction, multiplication and division will now be explained.

*Addition*

Since the processes of multiplication and division are accomplished in the apparatus of the present invention by successive additions or subtractions, with appropriate shifting, the computer may, if desired, be utilized simply to add or subtract by eliminating the shifting step. However, since the processes of addition and subtraction as embodied herein are accomplished in the same manner and with apparatus identical to that described in the aforementioned application, Serial No. 776,439, now Patent No. 2,568,932, it will be desirable to describe these processes only so far as is necessary to provide a basic understanding of the part they play in the more complex processes of the present invention.

The first step is to set the various control switches to the positions appropriate for addition, as follows:

(1) Set polarity-reversing switch 163 to the "multiply" position (to the right in Fig. 4).

(2) Set the "multiply-divide" switch 205 to the "multiply" position (to the left as shown in Fig. 4).

(3) Set the second reversing switch 207 to the "add" position (to the left in Fig. 4).

(4) Set the five input selector switches 173 of the multiplicand or divisor group to positions indicative of the respective digits of the first binary number $X_1$. In Fig. 4 these switches are shown in position for the binary number 01011. In order to avoid confusion as to the position of the binary point, particularly in multiplication and division, it is preferable to add a sufficient number of zeros to the left of the number to fill all stages of the appropriate portion of the computer. While the multiplier group of switches 171 and the dividend switches 255 are only effective if the transfer switches 175 and 253, respectively, are actuated, preferably switches 171 and 255 should all be set at zero. Switches 171 and 255 are not used for simple addition.

It should be noted here that the control switches 175, 181, 183, 157 and 253 are all spring-biased to normally "open" positions and need not be pre-set.

The second step is to actuate the "clear" switch 181 momentarily to clear all stages of the computer. All indicator lamps will now be out.

The third step is to actuate totalizer switch 183 momentarily. This registers or transfers the number 01011 into the accumulators of the respective stages G, H, K, L and M. As in the earlier application referred to above, the transfer is accomplished by changing the +17 volt and −23 volt potentials which are normally applied to the outer terminals of the rectifiers 111 and 113 through leads 185, 187 to an intermediate value, say −3 volts. In the present apparatus, a novel source is provided for the −3 volt transfer voltage. As will appear more fully hereinafter this arrangement is necessary in order to control automatically the transfer of the digits to the accumulator in the process of division. For the present, however, it will suffice to show how the system produces the −3 volt transfer voltage to effect such a transfer.

It will be understood that stage U is indicating zero (tube 13 is conducting), terminal 127 of stage U (Fig. 2) is at a potential of −23 v. and terminal 129 is at a potential of +17 volts. With reversing switch 207 to the left (Fig. 4), the grid, and therefore the cathode, of cathode follower tube 193 will be negative, while the grid, and thus the cathode, of tube 199 will be positive. The circuit constants are selected so that these voltages are, respectively, more negative and more positive than the −3 volt potential applied to the lower terminals of rectifiers 201 and 203. Both rectifiers therefore conduct, due to the polarity of their connections, and hold both leads 189 and 195, which feed into switch 183 at −3 volts. The actuation of "totalizer" switch 183 therefore brings both leads 185 and 187 to −3 volts as in the earlier system. Stage G will then transfer the digit one from its associated switch 173G into its accumulator. This is because the conditions in stage G are as shown in line (*c*) of Table I, supra. That is, $A_n(y)$, the voltage at point 34 (Fig. 2) is −23 volts; $A_n(x)$ at terminal 75 is +17 volts; $C_{n-1}$ at terminal 77 is −23 volts; $C_n$ is +17 volts because the voltage at point "P" will be approximately −10 volts (the average of $A_n(y)$, $A_n(x)$ and $C_{n-1}$) so tube 73 will be cut off and its plate voltage will be maximum positive. Consequently, point Q will be at a potential of +7 volts at the time the "totalizer" switch is operated. Rectifier 111 then conducts, pulling point Q down to approximately −3 volts, since the anode of this rectifier is connected to point Q and its cathode is connected to lead 187 through terminal 115. A negative pulse is therefore applied by capacitor 109 to the grid of tube 13, causing this tube to cut off. The resulting rise in its plate voltage ignites indicator lamp 63, indicating the digit 1 for that stage.

In the stage H, a similar action takes place. However, in this stage the digit zero is represented by +17 volts. It will be observed from Fig. 2*a* that when this stage is set on "zero" the conditions of line (*h*), Table I, supra, apply. The potential of point Q is, therefore, −13 volts. When the totalizer switch is operated, rectifier 113 conducts and pulls the potential of point Q up to −3 volts. The resulting positive pulse causes tube 13 to conduct and indicator tube 63 to light, indicating a "one" for this stage as required.

Stages K, L and M respond similarly at the same instant with the result that the accumulators are so conditioned as to represent the required binary number in accordance with the convention adopted for each stage, and the respective indicator lamps will indicate visually the respective conditions.

The next step is to reset switches 173 to represent the binary number $X_2$ which is to be added to the number $X_1$.

The totalizer switch 183 is again momentarily actuated. This transfers the second number $X_2$ into the accumulator, and adds it to the number $X_1$, resetting the various stages to indicate the sum of $X_1+X_2$. The manner in which this is accomplished is explained fully in the copending application, now Patent 2,568,932 referred to above, and need not be repeated here.

Switches 173 may then be reset and the totalizer switch 183 actuated again and again until all the numbers to be added have been entered and transferred, until the capacity of the computer has been reached. In the case illustrated, the capacity for such additions is eleven binary places for the sum. In other words, all the accumulator stages G through U may be employed, and, of course, the system may be extended as many places as desired by adding additional stages. It is to be understood, of course, that in any sequence of additions the digits of a given binary place will always be set on the same switch.

The present arrangement provides a novel feature of some interest. It was pointed out above that the numbers are transferred into the accumulative adder by the voltage on leads 189, 195 and that these voltages are controlled by the output potentials produced by stage U. So long as the stage U remains "zero" the process is as described. However, when the sum is so large that the last binary place is finally utilized, stage U will change over to indicate a "one." Thus the potentials of output terminals 127 and 129 will be reversed, and terminal 127 will change to +17 volts while terminal 129 will go to −23 volts. As a result, the grid of cathode-follower 193 will go positive, as will its cathode. This will cut off rectifier 201 and lead 189 will have a positive potential, preferably equal to +17 volts or greater. Similarly, the −23 volt potential of terminal 129 now applied to the grid of tube 199 will drive the cathode of this tube negative. Rectifier 203 will then be ineffective and the potential of lead 195 will be negative also, preferably of the order of −23 volts or greater. As a result, actuating the totalizer switch 183 will produce no transfer effect in the various stages since there will be no effective change in potential of leads 185 and 187. Consequently, when the accumulator is full, the further transfer of additional numbers is automatically prevented. The operator will immediately observe this. If desired, a simple interlock may be provided to prevent further actuation of the totalizer switch when the potential of lead 195 or lead 189 changes, or the change in potential may be utilized to give any desired warning.

*Subtraction*

The process of subtraction, like that of addition, is an inherent part of the computer, although the present apparatus was not designed especially for this purpose. As pointed out above, subtracting "Y" (the subtrahend) from "X" (the minuend) is accomplished by adding to "X" the complement of "Y," dropping the number in the highest place and adding one.

It is assumed that the number "X" has been registered in the accumulator so that stage G is the "units" place for the number, either as the result of a previous computation, or by entering the respective digits on switches 173 and then operating the totalizer switch 183. Polarity reversing switch 163 is now placed in the "divide" position (to the left as shown in Fig. 4). This will reverse the polarities of the leads 165 and 167, and when a switch 173 is set on "zero" the corresponding stage will be provided with a voltage representative of "one" and vice versa, thus complementing the number "Y" which is entered on these switches. At the same time switch 169 causes +17 volts to be applied to the carry-over input terminal 77 of stage G. When the "totalizer" switch is operated this voltage will add a "one" to the number "X" which is in the accumulator stages.

At this point there are two alternatives. Multiply-divide switch 205 may be placed in the "multiply" position (to the left) or in the "divide" position (to the right) and the totalizer switch 183 then operated.

In the first case the subtraction will be registered whether the difference is positive or negative. Stage N will act as an indicator, however, since it is in the binary place above the highest place of the subtrahend. If the lamp lights to indicate a "one," the difference is positive, while if the lamp does not light, the difference is negative.

In the second case stage N is used to control the subtraction. If the difference is positive, operating the totalizer switch will complete the subtraction, and the accumulator stages will indicate the difference. If, however, the subtraction would have been negative if made, a control voltage derived from stage N is used to prevent the transfer of the difference into the accumulator. This action is used in connection with the process of division and will be explained more fully hereinafter.

*Multiplication*

The use and function of the apparatus of the invention in performing the multiplication of two binary numbers will now be explained.

The first step is to set the various control switches to positions appropriate for multiplication, as follows:

(1) Set polarity-reversing switch 163 to the "multiply" position (to the right in Fig. 4).

(2) Set the "Multiply-Divide" switch 205 to the "multiply" position (to the left in Fig. 4).

(3) Set the second reversing switch 207 to the "multiply" position (to the right).

(4) Momentarily operate the "clear" switch 181.

The multiplier is then set up on the multiplier group of switches 171. It should be noted here that the multiplier can be set in any consecutive stages where there are more stages available than there are significant numbers in the multiplier. However, the stage representing "units" must be noted. That is, the binary "point" (the equivalent of the decimal point) must be considered if zeros are added to the right of the multiplier. Preferably, however, the place to the right is taken as the "units" place. The switches are shown in positions corresponding to 01101, the multiplier of the multiplication problem used as an example above. "Transfer multiplier" switch 175 is now momentarily depressed, shifting the multiplier into the accumulator. Stages O, R, S, T and U will be set accordingly, and the lamps, if used, will light in accordance with the respective switch positions.

The multiplicand is then set by suitable adjustment of switches 173. In Fig. 4, the switches are shown in position for 01011, the multiplicand of the above multiplication example.

The totalizer switch 183 is now depressed momentarily.

It has been shown that in multiplication the multiplicand may be multiplied by the successive digits of the multiplier beginning with either the highest or the lowest binary place. In this case the sequence will be from the highest place to the lowest. Consequently, the multiplicand should first be multiplied by the zero in the highest multiplier stage U. The sub-product, zero, should then be transferred to the accumulator. This, of course, is equivalent to not transferring the multiplicand to the accumulator. To accomplish this, the action of the totalizer switch 183 is so controlled by the digit "zero" of the multiplier that the multiplicand is not transferred. This is accomplished by the control circuit starting with the output terminals 127, 129 of stage U. When this stage is indicating "zero" (tube 13 is conducting) terminal 127 will be −23 volts and terminal 129 +17 volts. With reversing switch 207 to the right, the grid and cathode of tube 199 will be about −23 volts so that rectifier 203 is non-conducting and lead 195 will be at the same potential. So also the grid and cathode of tube 193 will be about +17 volts, rectifier 201 will be non-conducting, and lead 189 will be at the same potential. Thus, operating the totalizer switch does not transfer the multiplicand, since leads 185, 187 are simply switched from contacts at one potential to contacts at the same potential.

The "shift" switch 157 is now momentarily actuated. This causes each accumulator B to U to be conditioned to indicate the binary digit previously indicated by the stage to the right, that is, the stage in the next lower place. Stage A will always be conditioned to indicate zero when the shift switch 157 is operated because shifter 139A is connected to a fixed voltage source of −23 volts, the effect of which is to transfer a zero into stage A. Thus all entries registered in the accumulator and adder stages are shifted one place to the left. Shifting is accomplished in the following manner.

Lead 141 is normally maintained at +17 volts and lead 143 at −23 volts by shift switch 157. Actuating the switch brings the potential of lead 141 down to ground potential and brings the potential of lead 143 up to ground potential.

Referring now to Figs. 2 and 3, consider the effect of this operation on stage U, for example. Tube 13 of stage U is conducting initially to indicate "zero." In stage T (Fig. 2*a*) tube 13 is also conducting to indicate "one." Output terminal 129 of stage T is therefore at +17 volts, and this potential is applied to input terminal 145 of the associated shifter 139U. When lead 141 suddenly goes to ground potential, the upper rectifier 147 of shifter 139U conducts, bringing the potential of its anode rapidly down toward ground potential. The resulting negative pulse is applied through the coupling capacitor 153 to the shift input terminal 123 of stage U, where the pulse is applied to the grid of tube 13. Tube 13 is thereby cut off and lamp 61 lights to indicate "one" for the stage, as required.

It should be noted here that had stage U already been indicating "one," tube 13 of that stage would have been non-conducting, and the negative pulse would have had no effect. In other words, the stage would continue to indicate "one," as required.

Assume, however, that stage T had been set on "zero." Output terminal 129 of stage T (Fig. 2A) and the input terminal 145 of shifter 139U would then have been −23 volts (tube 11 conducting). In this case the upper rectifier 147 in device 139U would remain non-conducting as its anode would be negative with respect to its cathode. However, when lead 143 is suddenly raised to ground potential the lower rectifier 149 will conduct and its cathode will go toward the same potential. The resulting positive pulse would be applied through capacitor 153 to the grid of tube 13 of stage U. If this tube was already conducting to indicate zero, there would be no change. If, however, tube 11 of stage U had been non-conducting to indicate "one" for that stage, the flip-flop would be inverted and tube 13 would conduct, to indicate "zero." Thus, under all conditions, the condition of each accumulator at the time the shift switch is actuated is transferred to the stage in the next higher binary place.

So, in the present example, after actuating shift switch 157, stages U, T and R are set on "one," and stages S and O are set on "zero."

The totalizer switch 183 is now pressed momentarily again. Since stage U is now "one" the multiplicand should be carried into the adder stages G through M. From what has been said above it will be understood that the output potentials of stage U are now such that the "totalizer" switch 183 is effective to transfer the digits determined by switches 173 into the adder stages. The transferred multiplicand may be called the first subproduct. The "shift" switch 157 is now operated, shifting the multiplier one more place to the left, and also shifting the first sub-product to the left into stages N, M, L, K and H, stage G now being zero.

Stage U is again a "one." The "totalizer" switch 183 is again operated. This adds the multiplicand to the shifted first sub-product, as in the example given earlier, the new second subproduct appearing in the accumulator stages N, M, L, K, H and G.

This process of registering and shifting is repeated until the multiplier has moved off to the left, and the product will then appear in the stages U through G. In effect, the multiplier is scanned across stage U, so that the multiplicand is multiplied by each digit of the multiplier in turn, from the highest place to the lowest. While the successive digits of the multiplier are lost, this is of no moment, since they each, in turn, serve their purpose of indicating whether or not the multiplier should be added to the successively shifted sub-products.

*Division*

In order to perform the process of numerical division, the apparatus is first set up as follows:

(1) Set polarity reversing switch 163 in the "divide" position (to the left as shown in Fig. 4).

(2) Set the multiply-divide switch 205 to the "divide" position (to the right as shown in Fig. 4).

Switch 207 is ineffective when the above has been accomplished, and may be left in any position. "Clear" switch 181 is momentarily operated to set all stages to "zero."

The first step is to set up the "set dividend" switches 255 to the proper positions as determined by the respective digits of the dividend. As illustrated in Fig. 4, these switches are set for the binary number 0010001111, which corresponds to 143 in the decimal system.

The second step is to set up the divisor switches 173. Assuming that it is desired to divide 143 by 11, the divisor switches would be set to 01011, as shown. The multiplier switches 171 are not used for division.

Transfer dividend switch 253 is now momentarily actuated to transfer the dividend into stages B through M.

The manner in which this is accomplished is as follows: Switch 253, when actuated, causes lead 251 to rise suddenly to a positive potential with respect to ground as determined by battery 249 or other suitable source. Depending on the position of the respective ones of the switches 255 a positive pulse will be applied through the coupling capacitor to the grid of one or the other tube 11 or 13 of each stage. Thus, in the case of stage B, which is of the type illustrated in Fig. 1A, the pulse will be applied to terminal 49 which is connected to the grid of tube 13, causing this tube to conduct. Lamp 63 will light, indicating "one" for that stage as required.

In the case of stage C, which is of the type illustrated in Fig. 1, the position of switch 255C is such that the pulse will also be applied to terminal 49, but in this case terminal 49 is connected to the grid of tube 11, causing it to conduct. Tube 13 is cut off and lamp 63 lights to indicate "one," as required. The other stages behave similarly, as will be understood, and the five lower places of the dividend are thus transferred into the accumulator stages B through F. The adder stages G through M react similarly, it being noted from Figs. 2 and 2A that dividend input terminals 119 and 121 connect through resistors to the grids of tubes 11 and 13 in the accumulator portions of these stages. Consequently, the five higher places of the dividend are transferred into adder stages G through M.

The totalizer switch 183 is now operated. The effect of this operation will now be described.

As in the example given above, the divisor is inverted (by polarity-reversing switch 163) so that the voltages $A_n(x)$ applied to the input terminals 75 of stages G through M represent the complement of the divisor. The control circuit including tubes 237, 229 and 215 now operate to determine whether the subtraction, if made, would be positive or negative, and to control the transfer process so that the subtraction is only registered if the difference is positive. At the same time the control circuit applies to stage A a voltage which sets its condition so as to register the first (highest power of two) cipher of the quotient. In the case illustrated the first trial subtraction, if made, would be negative since the following subtraction (addition of the complement) is made:

| N | M | L | K | H | G | Stage |
|---|---|---|---|---|---|---|
| | 1 | 0 | 1 | 0 | 0 | Divisor complemented |
| | | | | | 1 | Add 1 |
| | 0 | 0 | 1 | 0 | 0 | Significant portion of dividend |
| 0 | 1 | 1 | 0 | 0 | 1 | Difference |

The "zero" in the difference under stage N indicates that the difference is negative and that the first trial division does not "go." It is therefore desired that the subtraction not be registered. It may be noted here that the complemented divisor is not applied to stage N in the computer, and therefore no cipher has been shown under this stage in the illustration above. The input $A_n(x)$ to stage N is always zero, and is not complemented. In the computer a voltage must therefore be derived which will determine what the condition of stage N would be if the addition were actually made, taking into account the existing condition of the accumulator switch 9a of stage N and the voltages applied to the stage which would determine its new condition. From Table I it is evident that these voltages are: (1) The voltage $A_n(x)$ applied to terminal 75, (2) the voltage $A_n(y)$ which indicates the existing condition of the accumulator 9A, (3) the carry-over voltage $C_{n-1}$ from the preceding stage M, and (4) the carry-over voltage $C_n$ applied to the following stage. Corresponding voltages are also present in each of the stages G through M. As soon as switches 173 are set, the averaging resistance networks in each stage produce at the respective points Q a voltage indicative of the digit for that place of the sum. Thus the addition is accomplished in the resistance networks themselves, the "totalizer" switch merely functioning to set the accumulator stages accordingly. So the potential of point Q in stage N can be made to provide the necessary information which will "anticipate" the condition of stage N if the sum were in fact transferred into the accumulator.

It has been shown that in the addition of two binary numbers X and Y the carry-over sequence is such that for any digital place $$A_n(x+y)=A_n(x)+A_n(y)+C_{n-1}-2C_n \qquad (1)$$

and since it may be observed that the potential of point Q is:

$$Q=\frac{A_n(x)+C_{n-1}-2C_n}{4} \qquad (2)$$

it follows that $$A_n(x+y)=4Q+A_n(y) \qquad (3)$$

By adding the potential of point Q to the potential $A_n(y)$ representative of the condition of the accumulator, it is possible to obtain in stage N a voltage which represents the digital value of the corresponding place of the sum of the binary number X and Y, as required.

In order to conserve the symmetry of the adder stages, the point Q potential of stage N is reproduced at the cathode of cathode-follower tube 237, the high input impedance of the grid of this tube effectively isolating the control circuit from the circuits within stage N. To obtain a control voltage indicative of the total $A_n(x+y)$ the voltage $A_n(y)$ from terminal 127 is therefore added to the voltage of point Q in such a manner that the later voltage is four times as effective as the voltage $A_n(y)$. This is accomplished by making resistor 235 four times as large, say 200,000 ohms, as resistor 233, which is, say 50,000 ohms. Thus point Q* (Fig. 4) will have the following values under the various possible conditions of operation shown. For convenience a part of Table II is a restatement of the information previously shown in Table I.

TABLE II

| | (1) $A_n(x)$ | (2) $A_n(y)$ | (3) $C_{n-1}$ | (4) $C_n$ | (5) Point Q | (6) Point Q* | (7) Point 259 |
|---|---|---|---|---|---|---|---|
| | V. | V. | V. | V. | V. | V. | V. |
| (a) | +17 | −23 | +17 | −23 | −3 | −7 | +17 |
| (b) | +17 | −23 | −23 | +17 | +7 | +1 | −23 |
| (c) | +17 | +17 | +17 | −23 | −3 | +1 | −23 |
| (d) | +17 | +17 | −23 | −23 | −13 | −7 | +17 |

The values of $A_n(x)$ in column (1) are always +17 volts (zero) for stage N. Columns (2), (3), (4) and (5) are from Table I. Point Q* (column (6)) is the voltage at the junction of resistors 235 and 233. These values are derived by taking four times the voltage for point Q, adding the corresponding voltage for $A_n(y)$ and dividing by five, to obtain the average.

The voltages at point Q* are applied to amplifier tube 229 and limited in the plate circuit of this tube to standardized values of −23 and +17 by rectifiers 221 and 223. Thus if point Q* is +1 volts, tube 229 conducts, its plate potential drops to a low value so that the potential at the mid-point of the rectifiers 221 and 223 (point 259) tries to go more negative than −23 volts by reason of resistor 225 which is connected to a source of high negative voltage, say −500 volts. As in the other cases, rectifier 223 conducts, however, and holds the the voltage at point 259 at a fixed value of −23 volts. When point Q* is −7 volts, tube 229 is cut off, its plate potential rises to a high value such that the potential at point 259 tries to go above +17 volts, but is held to this value by the action of rectifier 221. The voltages at point 259 are the standardized output voltages corresponding to the point Q* voltages. Due to the polarity reversal of tube 229, however, these voltages are reversed with respect to the convention adopted for stage N, so that at this point +17 volts represents "one" and −23 volts represents "zero."

Point 259 is connected to contact 261 of switch 205, and through the switch to the grid of cathode-follower tube 199. The same voltage appears on the cathode and is applied to lead 195 through resistor 197. When the cathode is positive lead 195 is held to −3 volts by rectifier 203. This occurs when point 259 is +17 volts.

Tube 215 is a polarity-reversing tube with standardized output, controlled by rectifiers 209 and 211, the controlled voltage being applied to contact 263 of switch 205 and thus to the grid of tube 193, where the cathode output voltage appears in opposite polarity to that of the cathode of tube 199. Thus when the potential at point 259 is +17 volts and the cathode of tube 199 is also +17 volts, the cathode of tube 193 is −23 volts. When point 259 is −23 volts, this situation is reversed.

It will be appreciated, therefore, that the potential of point 259 controls the registration effect of "totalizer" switch 183 in exactly the same manner as has been described above when switch 205 is in the "multiply" position. That is, when point 259 is +17 volts, leads 195 and 189 are both held to −3 volts and the "sequeezing" action resulting from the operation of the "totalizer" switch will effect the transfer of the divisor into the accumulators, the required subtraction being made simultaneously. If, however, point 259 is −23 volts, lead 189 will have a value of +17 volts while lead 195 will have a value of −23 volts, and the operation of the "totalizer" switch will be ineffective, since the potentials of leads 185 and 187 will not be changed.

The voltage at point Q* or point 259 is indicative of the sum $A_n(x+y)$ for the stage N, and is determined before the sum has been registered in the accumulator by the operation of the "totalizer" switch. Since +17 volts at point 259 indicates that the sum for digit N will be a one, this is the condition when it is desired to effect the transfer into the accumulator, and that this will, in fact, occur has been pointed out above. However, a zero for stage N (−23 volts at point 259) indicates a negative resultant, and also prevents the transfer of the divisor when the "totalizer" switch is operated.

Finally, means is provided for registering in stage A the fact that the divisor did not "go." From the example last given above, N is a zero so that the highest digit of the quotient should be zero. In such case the voltage at point 259 will be −23 volts. This voltage is applied through resistor 241 to squeezing rectifiers 243 and 245. When the "totalizer" switch 183 is operated, leads 185 and 187 do not change in potential, as pointed out above, and therefore no pulse is transmitted by capacitor 247 to stage A. Since this stage was previously set on zero, it remains on zero, as required.

It should be noted here that had conditions been otherwise, that is, had the divisor "gone" into the dividend, the potential of point 259 would have been +17 volts and leads 185 and 187 would have been "squeezed" to −3 volts by the totalizer switch. This would have caused a negative pulse to be applied to the grid tube 13 of stage A (Fig. 1), extinguishing the tube and causing the lamp 63 to light, to indicate a "one" in stage A, as required.

The next step is to operate the "shift switch" 157. As described above this causes the condition of each stage to shift to the next higher stage. Thus the "zero" in stage A moves into stage B, the "one" in B moves into C, the "one" in C moves into D, etc. When this takes place, stage G through N will indicate the highest places for the shifted dividend as shown below, while the divisor will still be applied to the input terminals of these stages as before. This may be illustrated as follows:

| N | M | L | K | H | G | Stage |
|---|---|---|---|---|---|---|
| | 1 | 0 | 1 | 0 | 0 | Divisor Complemented |
| | | | | | 1 | Add 1 |
| 0 | 0 | 1 | 0 | 0 | 0 | Significant portion of dividend shifted |
| 0 | 1 | 1 | 1 | 0 | 1 | Difference |

The "totalizer" switch is again operated. Since stage N is zero, the difference is negative, and the addition is not registered. Stage A therefore stays on zero to indicate a zero in the second-highest place of the quotient.

Shift switch 157 is again operated to shift the quotient and the dividend one place to the left. When this is done the condition will be:

| N | M | L | K | H | G | Stage |
|---|---|---|---|---|---|---|
| | 1 | 0 | 1 | 0 | 0 | Divisor complemented |
| | | | | | 1 | Add 1 |
| 0 | 1 | 0 | 0 | 0 | 1 | Shifted dividend |
| 1 | 0 | 0 | 1 | 1 | 0 | Subdifference |

The "totalizer" switch is operated. In this case the addition is registered and, at the same time, a "one" is inserted into stage A for the third-highest place of the quotient. The subdifference appears in the accumulator stages G through M.

The "shift" switch is operated again to shift the quotient and the subdifference. The condition will then be:

| N | M | L | K | H | G | Stage |
|---|---|---|---|---|---|---|
| | 1 | 0 | 1 | 0 | 0 | Divisor Complemented |
| | | | | | 1 | Add 1 |
| 0 | 0 | 1 | 1 | 0 | 1 | Shifted subdifference |
| 1 | 0 | 0 | 0 | 1 | 0 | Second subdifference |

The "one" previously in the N stage has shifted into stage O, and is no longer considered. The "totalizer" switch is then operated to register the addition shown above. Since Stage N is a "one," the divisor "goes," and, at the same time, a "one" is inserted in stage A for the fourth-highest place of the quotient. The second subdifference appears in stages G through M as shown.

The "shift" switch is again operated. The condition may then be represented by:

| N | M | L | K | H | G | Stage |
|---|---|---|---|---|---|---|
| | 1 | 0 | 1 | 0 | 0 | Divisor Complemented |
| | | | | | 1 | Add 1 |
| 0 | 0 | 0 | 1 | 0 | 1 | Second subdifference, shifted |
| 0 | 1 | 1 | 0 | 1 | 0 | Third Subdifference |

Once again stage N is "zero" and the divisor does not "go." The "totalizer" switch is operated, but the control circuit functions to prevent the registration of the third subdifference in the accumulators, while a "zero" is inserted in stage A. It should be noted that while stage A was previously set on "one," the operation of the shift switch cleared stage A so that it returned to "zero." Thus the next digit of the quotient is a zero.

The shift switch is then operated, shifting the second subdifference one more place, and also shifting the quotient. The condition then will be:

| N | M | L | K | H | G | Stage |
|---|---|---|---|---|---|---|
| | 1 | 0 | 1 | 0 | 0 | Divisor complemented |
| | | | | | 1 | Add 1 |
| | 0 | 1 | 0 | 1 | 1 | Second subdifference shifted again |
| 1 | 0 | 0 | 0 | 0 | 0 | Remainder |

The totalizer switch is then operated. Since stage N is "one" the divisor "goes," the subtraction is registered and a "one" is inserted in stage A. The "shift' switch is again operated. This drops the one in the highest place, and the remainder is seen to be "zero."

The quotient 01101 now appears in stages B through F. By suitably marking stage B as the "units" place, stage C as the "twos" place, etc., the quotient may be read directly without the necessity of calculating the binary point. It is also apparent that there are two alternatives for stage A. The first is that it may be provided with an indicator light, as shown, and considered as the "halves" place to indicate the digit to the right of the binary point. The second alternative is that this stage may be used without an indicator light and not appear in the line of stages, in which case the accuracy of division can only be carried to the "units" place.

It should be noted that when five places are provided for the divisor, and the significant digits of the divisor are placed as far to the right as possible, as in the illustration, the binary point is automatically indicated if the "totalizer" and "shift" switches are each operated five times. Of course, if the number of stages in the computer is other than five, these switches should each be operated a number of times equal to the number of places provided.

While for the purpose of illustration the various control switches have been shown as manually operated switches, it will be understood that electrically operated switches may be employed. For example, each switch 171 and 173 may be replaced by an electronic switch with standardized output of the type illustrated in Fig. 1, to produce −23 or +17 volts as required under the control of electrical impulses applied to one of the tubes. Also, it will be understood that where the computer is used as a component of other apparatus, electrical voltages indicative of the respective conditions of the accumulators may be derived instead of, or in addition to, the visual indication provided.

The various voltage-limiting rectifiers employed are preferably of the semi-conductor type which are inexpensive and very small. Thermionic diodes may, of course, be employed if desired.

It may be useful to provide means for shifting the conditions of the accumulators to the right as well as to the left. This would be useful, for example, for dividing by two, since shifting the number in the accumulator, where a predetermined stage represents the "cents" place, is equivalent to shifting the binary point. This may readily be accomplished by providing an additional shifter 139 for each stage, a second pair of leads and a switch to duplicate leads 141 and 143 and shift switch 157. In such case, however, the input terminals 145 of the shifters would be connected to the output terminals 129 of respective stages G through U or the output terminals 53 of respective stages B through F; while output terminals 155 of the shifters would be connected to input terminals 123 and 61.

What I claim as my invention is:

1. In apparatus having a plurality of devices each conditionable to one or the other of two predetermined conditions and arranged in a sequence representative of the places of a binary number, the combination of shift means operative at will to set each device to a condition determined by the condition of the device which precedes it in said sequence, said shift means including a pair of leads connected by switch means either to sources of voltage of opposite potential or to a common point of intermediate potential, and a shifter for each stage comprising a pair of uni-directional conducting elements serially connected in opposition between said pair of leads, the mid-points of each pair of elements being capacity-coupled to respective succeeding stages and also connected to points in respective preceding stages which develop a voltage indicative of the condition of that stage.

2. A device of the character described in claim 1 in which said uni-directional conducting elements are connected to said pair of leads so as to be non-conducting with respect to said voltages of opposite polarity.

3. A device of the character described in claim 1 in which said devices each include a pair of three-electrode discharge tubes and in which each pair of elements is capacity-coupled to the grid electrode of one of said tubes.

4. In apparatus having a plurality of devices each conditionable to one or the other of two predetermined conditions and arranged in sequence representative of the places of a binary number, the combination of shift means operative at will to set each device to a condition determined by the condition of the device which precedes it in said sequence, said shift means including a pair of leads connected by switch means either to sources of voltage of opposite potential or to a common point of intermediate potential, and a shifter for each stage comprising a pair of uni-directional conducting elements having cathode and anode electrodes and being serially connected across said pair of leads, the cathode of one of said elements being connected to the one of said pair of leads connecting through said switch means to the more positive source of opposite potential voltage of said sources of opposite potential, and the anode of the other element being connected to the other of said pair of leads connecting through said switch means to the more negative source of opposite potential voltage of said sources of opposite potential, the mid-points of each pair of elements being capacity-coupled to respective succeeding stages and also connected to points in respective preceding stages which develop a voltage indicative of the condition of that stage.

5. In apparatus having a plurality of stages conditionable to one or the other of two predetermined conditions of stability and arranged in a sequence representative of the places of a binary number, each stage including a pair of devices having control elements, the combination of shift means to set each stage to a condition determined by the condition of the stage which precedes it in said sequence, said shift means including a switch and means responsive to the operation of said switch for applying to a control element of one device of each pair a voltage pulse having a polarity determined by the condition of the preceding stage.

6. In apparatus having a plurality of stages conditionable to one or the other of two predetermined conditions of stability and arranged in a sequence representative of the places of a binary number, each stage including a pair of devices having control elements, the combination of shift means to set each stage to a condition determined by the condition of the stage which precedes it in said sequence, said shift means including a switch and rectifier means responsive to the operation of said switch for applying to a control element of one device of each pair a voltage pulse having a polarity determined by the condition of the preceding stage.

7. A computer for digital binary computation comprising a plurality of stages arranged in a sequence and representing the successive binary places of a binary number, each stage including a device having two conditions of stability; means including a first group of switches for conditioning said stages to represent a first binary number, means including a second group of switches conditionable to represent, respectively, the digits of a second binary number and to apply one or the other of two voltages to a group of said stages representing the highest binary places; means including a further switch operable to condition said group of stages in accordance with the difference between the two binary numbers applied thereto, control means conditionable in accordance with the sign of said difference, and means responsive to one condition of said control means for rendering said further switch inoperative to condition said group of stages.

8. A computer for digital binary computation comprising a plurality of stages arranged in a sequence and representing the successive binary places of a binary number, each stage including a device having two conditions of stability; means including a first group of switches for conditioning said stages to represent a first binary number, means including a second group of switches conditionable to represent, respectively, the digits of a second binary number and to apply one or the other of two voltages to a group of said stages representing the highest binary places; means for producing a control voltage having one or the other of two values in accordance with the difference between said second number and the number represented by the established conditions of said group of stages; means including a further switch operable to condition said group of stages in accordance with the difference between said second number and the number represented by the established condition of said group of stages; and control means operable under the control of said control voltage for rendering said further switch inoperative to condition said group of stages.

9. A device of the character described in claim 8, which includes, in addition, shift means operative at will to condition each stage in accordance with the condition existing in the stage which precedes it in said sequence.

10. A device of the character described in claim 9 which includes, in addition, means responsive to the operation of said further switch and under the control of said control means for registering the condition of said control means.

11. A digital binary computer comprising a first group of switches selectively conditionable to represent the successive binary places of a first binary number; a like number of stages each including means conditionable to one or the other of two conditions; means operative to condition said stages in accordance with the conditions of said switches, respectively; a second group of switches conditionable to one or the other of two conditions and representative of the successive binary places of a second binary number; means responsive to the conditions of the switches of said second group and the conditions of a like number of said stages for producing a control voltage indicative of the sign of the difference between the said second number and the number represented by said like number of stages; switch means operative to condition said like number of stages in accordance with said difference; and means under the control of said control voltage for rendering said switch means inoperative or not in accordance with the sign of said difference.

12. A device of the character described in claim 11 which includes, in addition, shift means operative at will to condition each of said stages in accordance with the condition existing in the next adjacent stage.

13. A device of the character described in claim 12, which includes, in addition, means responsive to the operation of said shift means and under the control of said control voltage for registering the sign of said difference.

14. A device of the character described in claim 13, in which said means for registering the sign of said difference includes one or more of said stages.

15. A device of the character described in claim 11 in which said means for producing a control voltage includes an additional stage connected with the other stages so as to be conditioned in accordance with the digit in the next higher binary place.

16. A digital binary computer which includes a first group of switches selectively conditionable to represent the successive binary digits of a dividend; a device which is conditionable to one or the other of two conditions in circuit with each switch of said first group, said devices representing the successive binary places of the dividend, and including a sub-group comprising the stages representing the higher binary p'aces; first switch means operative to condition said devices in accordance with the respective conditions of the switches of said first group; a second group of switches respectively conditionable to one or the other of two conditions; and representing the respective binary places of the divisor; means in circuit with said second group of switches for applying to the devices of said sub-group voltages representative of the respective digits of the divisor; means in each device for producing a voltage representative of its condition; means for applying to each device a voltage indicative of the condition of an adjacent device; means for combining said voltages to produce a control voltage indicative of the sign of the difference between the binary numbers represented by the switches of said first and second groups which are in circuit with said sub-group of devices; switch means for changing the conditions of said sub-group of devices to register said differences; means under the control of said control voltage for rendering said last-named switch means ineffective; and shift means for setting the condition of each device to a condition representative of the digit previously indicated by an adjacent device.

17. A device of the character described in claim 16, in which said last-named switch means is rendered ineffective only when the sign of said difference is negative.

18. A device of the character described in claim 17, which includes, in addition, means operative in response to each operation of said last-named switch means for registering one digit of the quotient, said digit having a value determined by the sign of said difference.

19. A device of the character described in claim 18 in which said registering means includes an additional conditionable device interconnected with the device representing the lowest binary place of said dividend, the condition of said additional conditionable device being responsive to control voltage upon the operation of said last-named switch.

20. A device of the character described in claim 19 in which said means for combining said vo!tages to produce a control voltage includes a second additional conditionable device interconnected with the device representing the highest binary place in said dividend, and conditionable upon the operation of said switch means to a condition determined by the sign of said difference.

21. A digital binary computer which includes a plurality of set-dividend switches selectively conditionable to represent the binary digits of a dividend; an electronic flip-flop having two conditions of stability in circuit with each of said switches, said flip-flops being arranged in cascade and representing the successive binary places of the dividend; a transfer-dividend switch operative to condition said flip-flops in accordance with the conditions of respective ones of said set-dividend switches; a plurality of divisor switches selectively conditionable to select first voltages of one value or another to represent the binary digits of a divisor; means in circuit with each flip-flop of a sub-group of flip-flops representing successive places including at least the highest place of the dividend for producing second voltages indicative of the conditions of respective flip-flops of said sub-group, the number of flop-flops in said sub-group being eoual to the number of said divisor switches; means associated with each flip-flop for combining respective first and second voltages with a carry-over voltage from the flip-flop representing the next lower p!ace to produce a resultant voltage uniquely defining the respective digits of the difference between said divisor and the portion of said dividend represented by said sub-group of flip-flops, and for producing a carry-over voltage for the flip-flop representing the next higher place; means including a totalizer switch operative to condition each flip-flop of said sub-group in accordance with the sign of said difference; and means including a shift switch for setting the condition of each flip-flop to a condition representative of the previous condition of the flip-flop representing the next lower place.

22. A device of the character described in claim 21, in which said means including a totalizer switch includes means for applying to said flip-flop a voltage pulse whose polarity is dependent upon the value of said resultant voltage.

23. A device of the character described in claim 22 which includes, in addition; means operative in response to each operation of said totalizer switch for registering one digit of the quotient.

References Cited in the file of this patent

UNITED STATES PATENTS

| | | |
|---|---|---|
| 2,192,612 | Lang | Mar. 5, 1940 |
| 2,404,047 | Flory | July 16, 1946 |
| 2,445,215 | Flory | July 13, 1948 |
| 2,580,771 | Harper | Jan. 1, 1952 |
| 2,709,771 | Dehn | May 31, 1955 |

OTHER REFERENCES

"Interim Progress Report on the Physical Realization of an Electronic Computing Instrument," Bigelow et al., published by the Institute of Advanced Study, January 1, 1947, page 99c, sketch 5.